Dec. 7, 1937. R. L'ORANGE Re. 20,573

LIQUID FUEL INJECTION PUMP

Original Filed June 26, 1933

Rudolf L'Orange, INVENTOR,
Smith, Michael and Gardiner, Attorneys

Reissued Dec. 7, 1937

Re. 20,573

UNITED STATES PATENT OFFICE 20,573

LIQUID FUEL INJECTION PUMP

Rudolf L'Orange, Stuttgart-Feuerbach, Germany, assignor of one-half to Frederick Richard Simms, London, England Original No. 1,999,330, dated April 30, 1935, Serial No. 677,724, June 26, 1933. Application for reissue April 2, 1937, Serial No. 134,691

11 Claims. (Cl. 103—41)

This invention is for improvements in and relating to liquid fuel injection pumps of the reciprocating plunger type in which the quantity of fuel delivered by the plunger is regulated by by-passing a variable portion of the fuel (known as the "spill") at each delivery stroke by means of a discharge port or passage co-operating with a control edge inclined with respect to the longitudinal axis of the plunger, the port or an end of the passage and the control edge being disposed one on the plunger and the other on the cylinder and the amount of "spill" being varied by relative rotation between the plunger and its cylinder so as to vary the moment at which the port crosses the control edge and thereby determine the amount of the spill and consequently the amount of fuel delivered from the pump for injection into an engine cylinder.

In pumps of the above type in which the suction is controlled by means of a port or ports adapted to be covered and uncovered by the plunger acting as a slide valve, without the employment of a suction valve, it is usual for the suction passage opening into the cylinder space of the pump to be utilized for the return flow of the spill, or for the passages for the suction and spill to be so arranged as to produce eddies in the liquid in the suction passage and interference between the two distinct actions referred to.

It is one of the objects of this invention to overcome the above defect and to provide a fuel injection pump in which the flow of the liquid through the suction passages is effected at all times in the same direction in a similar manner to the flow of steam in a uniflow steam engine, and thus by the avoidance of reversals in the fluid stream and the elimination of a suction valve which tends by its opening and closing movements to cause oscillations in the fluid, the formation of eddies in and the production of gas bubbles from the liquid is avoided.

Other features of the invention are pointed out in the ensuing description and in the appended claims.

In order that the invention may be fully understood, reference is directed to the accompanying drawing, in which Figure 1 is a vertical section of the upper portion of a liquid fuel injection pump constructed in accordance with the invention;

Figure 1:
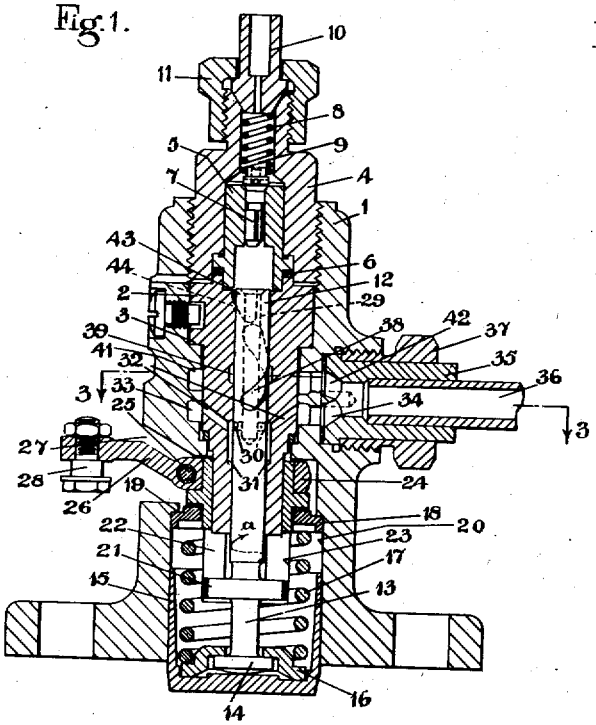
Figure 2:
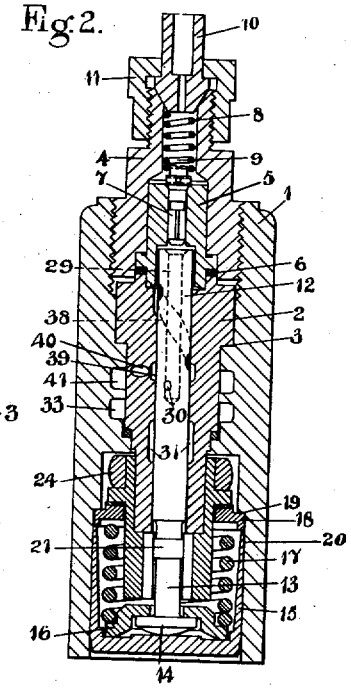
Figure 2 is a vertical section at right angles to Figure 1.
Figure 3:
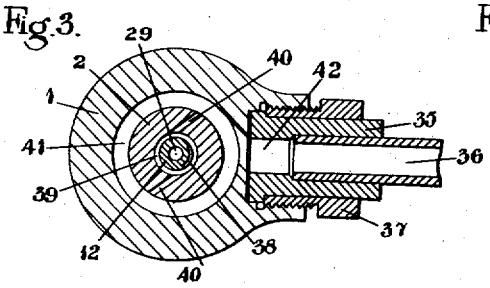
Figure 3 is a section on the line 3—3 of Figure 1.

Figures 1 to 3 illustrate the preferred embodiment of the pump in accordance with the invention. In this construction the pump comprises an outer casing 1 in which a cylinder liner 2 is secured against a shoulder 3 by means of a plug 4 screwed into the casing and bearing upon the upper end of the liner through the intermediary of a detachable cylinder head 5 and a packing washer 6; a discharge valve 7 controlled by a spring 8 is seated on the cylinder head and controls the discharge passage 9, the spring 8 reacting against a discharge pipe union 10 secured to the head 5 by a union nut 11.

A plunger 12 is arranged to be reciprocated in the bore of the liner 2 and is provided with a lower extension 13 having a foot 14 which is gripped between the bottom of a cylindrical slide 15 and a washer 16, the latter being pressed against the bottom of the slide 15 by a spring 17 which reacts against a washer 18 located against a shoulder 19 in the casing 1; the slide 15 is arranged to reciprocate in a guide bore 20 formed in the casing 1 and the spring 17 serves as a return spring for the plunger 12 which is arranged to be moved in an upward direction by means of a cam acting against the bottom of the slide 15 or against a roller secured thereto, the said cam being of known construction and which it is not necessary to illustrate in the drawing.

The extension 13 of the plunger is provided with a pair of diametrically opposed lugs 21 which extend into slots 22 formed in a sleeve 23 so as to be reciprocable in the said slots axially of the plunger. The sleeve 23 is pivotally mounted around the lower end of the liner 2 and rotation of the sleeve effects rotation of the plunger relatively to the liner by means of the lugs 21. A split ring 24 is clamped to the upper end of the sleeve 23 by a screw 25 and an arm 26 is provided upon the ring 24 and arranged to extend to the exterior of the pump through an opening 27 in the casing 1. The control rod or the like for effecting rotation of the sleeve and plunger is arranged to be secured to the arm 26 by means of a bolt 28.

The plunger 12 is provided with an axial bore 29 extending from the upper end of the plunger for about half the length thereof and lateral apertures 30 are arranged to establish communication between the lower end of the said bore and an annular recess 31 formed in the cylinder wall of the liner 2 around the plunger. Lateral passages 32 are formed in the liner and establish communication between the annular recess 31 and an annular passage 33 formed in the casing 1 around the liner 2. The annular passage 33 is arranged in communication with an inlet passage 34 formed in a pipe union 35 of a fuel supply pipe 36, the pipe union 35 being secured to the casing 1 by a union nut 37.

A helical recess 38 having closed upper and lower ends is formed in the exterior of the plunger 12 and is maintained at all times in communication with a discharge space constituted by an annular recess 39 formed in the liner 2 around the plunger 12 and lateral passages 40, Figure 3, are formed in the liner 2 to establish communication between the annular recess 39 and an annular recess 41 formed in the casing 1 around the liner 2. The annular recess 41 is arranged in communication with a spill outlet passage 42 formed in the pipe union 35 and communicating with the supply pipe 36. The upper end of the helical groove 38 is arranged to co-act with a pocket or recess 43 formed in the upper end of the bore of the liner 2 and which is provided with an inclined control edge 44.

In the operation of the pump liquid fuel is admitted from the pipe 36 through the inlet passage 34, annular passage 33, lateral passage 32, annular recess 31 and lateral apertures 30 to the bore 29 in the axial plunger and thence to the compression space in the cylinder head 5, so long as the lateral apertures 30 are in register with the annular recess 31 and the necessary difference of pressure exists between the space in the cylinder head 5 and in the supply pipe 36. During the upward stroke of the plunger, as soon as the lateral passages 30 have moved past the upper edge of the annular recess 31, the liquid fuel in the cylinder is delivered under pressure past the valve 7 and thence to the fuel injection nozzle arranged to be supplied by the pump, until the upper end of the groove 38 passes the control edge 44 of the pocket or recess 43 when the pressure in the cylinder space instantly drops and fuel is discharged during the remainder of the compression stroke through the groove 38 into the annular recess 39, thence through the passages 40 to the annular recess 41, spill outlet passage 42 and back into the suction pipe 36. In the drawing the plunger is shown in a position in which the groove 38 is arranged to bypass all the fuel during the delivery stroke so that no fuel is delivered past the valve 7. Upon rotation of the plunger however, in the direction of the arrow *a*, Figure 1, through the medium of the arm 26, the point at which the upper edge of the groove 38 passes the control edge 44 may be arranged to occur at any point within a predetermined range later in the compression stroke of the plunger, so that the length of the plunger stroke between the moment when the lateral apertures 30 are closed by passing beyond the upper edge of the annular recess 31 and the moment when the upper edge of the groove 38 passes the control edge 44 determines the amount of the fuel delivered past the delivery valve 7 to the injection nozzle.

It will thus be observed that the flow of the fuel into the cylinder space or pump chamber of the pump is effected through suction passages in the pump which are quite distinct from those passages which effect the discharge of the spill from the pump so that the flow of liquid through the suction passages is always in the same direction, whilst the pump is also free from the oscillation of liquid which is caused by the provision of a suction valve. Eddies of the liquid in the suction passages are thus completely avoided, as also the production of gas bubbles from the liquid.

The helical arrangement of the groove 38 causes a whirling of the spill in the annular recess 39 which tends by centrifugal action to discharge the spill through the passages 40, thus facilitating the discharge of the spill and producing a suction effect in the cylinder space during such discharge whilst the tangential arrangement of the passages 40 with respect to the annular recess 41 facilitates the discharge of the spill from the annular recess 39 to the annular recess 41 in which the fuel is again caused to whirl and so facilitate its discharge through the tangentially arranged spill outlet passage 42. Damping of the flow of the spill which is caused by sudden changes and reversals in the direction of flow and absence of adequate discharge spaces, is thus avoided.

It will be observed that the location of the annular suction recess 31 at a more remote point from the cylinder head than the annular recess 39 for the spill and which is subjected to higher pressure than the annular suction recess 31, serves to prevent leakage of liquid fuel past the plunger 12 in a downward direction, because any liquid leaking from the annular recess 39 downwardly is intercepted by the annulus 31.

Figure 4:
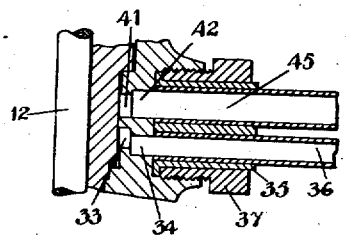
Figure 4 is a detail of inlet and outlet connections for a pump in accordance with the invention, illustrating a modification of Figure 1.

In the modification of the invention illustrated in Figure 4, the outlet for the spill from the pump is maintained separate from the fuel supply inlet, the fuel supply pipe 36 being arranged to convey the liquid fuel to the inlet passage 34 leading to the outer annular suction passage 33, whilst a discharge pipe 45 is arranged in communication with the spill outlet passage 42 leading from the outer annular spill recess 41. In this modification it is possible to supply fuel to the pipe 36 under pressure through a primary pump, whilst the pipe 45 may be arranged to discharge the spill directly back into the fuel tank.

Figure 5:
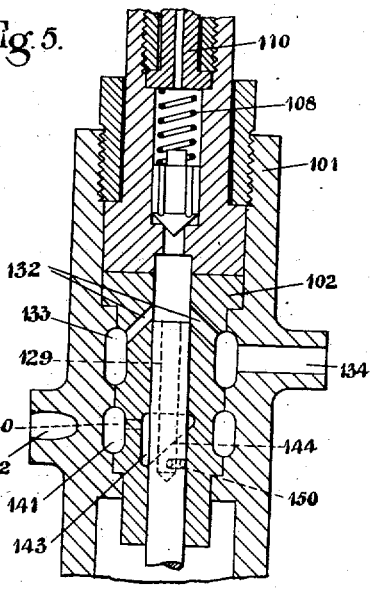
Figure 5 is a view similar to a portion of Figure 1 illustrating a modified construction of pump in accordance with the invention.

Referring to the modified construction of pump shown in Figure 5, the various parts have been designated by the same reference numerals as in Figures 1 to 3, where possible, but with the addition of 100. In this construction, liquid fuel is supplied through an inlet passage 134 to an annular suction passage 133 disposed around the cylinder liner 102 and thence through passages 132 directly past the plunger 112 to the cylinder space or pump chamber, the suction ports formed by the passages 132 being uncovered by the plunger at the end of the suction stroke. The spill is discharged through an axial bore 129 in the plunger and thence through a port 150 formed laterally in the plunger into a pocket or recess 143 sunk in the cylinder wall and the upper portion of which may be in the form of an annulus. The spill leaves the pocket 143 through one or more passages 140 and passes into an annular passage 141 from which it is discharged through a spill outlet passage 142. Preferably, the port 150 and passages 140 and 142 are tangentially arranged with respect to the pocket or recess 143 and annular recess 141 for the same reason as that stated with reference to Figures 1 to 3.

The pocket or recess 143 is provided with a control edge 144 which co-operates with the port 150 to determine the moment at which the spill commences in a similar manner to that of the end of the groove 38 with the control edge 44 above described, the plunger 112 being rotatable by control means of the same character as that disclosed in Figures 1 and 2.

What I claim and desire to secure by Letters Patent of the United States is:—

1. In a liquid fuel injection pump of the type in which the pump output is varied by by-passing fuel from the pump chamber at the end of the injection stroke, the combination comprising a main pump body, a cylinder disposed within said pump body and including a pump chamber, a plunger reciprocable in said cylinder and pump chamber and rotatably adjustable with respect thereto, a suction passage formed interiorly and axially of said plunger, means for opening and closing said suction passage during reciprocation of the plunger within said cylinder and pump chamber, a spill passage disposed wholly exteriorly of the plunger and constituted by one part comprising a groove having closed ends and generated helically around the axis of the plunger and formed in the outer surface of the plunger and another part comprising a recess having a control edge formed in the cylinder wall, said recess being in constant communication with the pump chamber, the cooperating edges of said spill parts being parallel to each other, and an annular recess provided in the cylinder wall around the plunger and communicating constantly with said helical groove, around which recess the fuel is caused to circulate rapidly due to the direction of flow imparted thereto by the helical groove so that the discharge of fuel from the said annular recess is facilitated, and a discharge port for said annular recess.

2. A fuel pump as claimed in claim 1, wherein said discharge port is arranged tangentially to the said annular recess, the inlet end of said discharge port being disposed so as to face in opposition to the direction in which the liquid in the annular recess is circulating.

3. In a liquid fuel injection pump of the type in which the pump output is varied by by-passing fuel from the pump chamber at the end of the injection stroke, the combination comprising a cylinder including a pump chamber, a plunger reciprocable within said cylinder and pump chamber, suction and spill passages formed distinct from one another, means for opening and closing said suction passage during reciprocation of the plunger within said cylinder and pump chamber, the suction passage being disposed interiorly of said plunger and the spill passage being disposed wholly exteriorly of said plunger and constituted by one part formed in the outer surface of said plunger and another part in the wall of said cylinder, one of said parts of said spill passage being formed as a groove having closed ends and generated helically around the axis of said plunger and the other of said parts of said spill passage being formed as a recess, said recess being in constant communication with the pump chamber, thereby constituting a spill passage avoiding changes in the direction of flow of the spill fuel and consequently ensuring a rapid flow of said spill fuel therein, an annular recess formed in said cylinder wall with which said helical spill groove is in constant communication, and means for rotatably adjusting said plunger in said cylinder whereby the moment during the stroke of the plunger at which the helical groove of the spill passage registers with the other part of said spill passage in order to effect spill of the fuel is adjustable, and a discharge port for said annular recess.

4. In a liquid fuel injection pump the combination of a cylinder including a pump chamber and a plunger reciprocable within said cylinder and pump chamber, a suction port in the cylinder wall, a lateral passage in the plunger adapted to coact with said port to control the admission of liquid to the pump chamber during reciprocations of said plunger within said cylinder and pump chamber, said passage being arranged in communication with an axial bore formed in the plunger and opening into the pump chamber a spill passage formed as a helical groove in the outer surface of the plunger and having closed upper and lower ends, a pocket in the cylinder wall provided with a control edge inclined relatively to a plane transverse to the cylinder and adapted to cooperate with the closed upper end of the spill passage during each compression stroke of the plunger to by-pass liquid from the pump chamber, said pocket being in constant communication with said pump chamber, an annular recess in the cylinder wall around said plunger and arranged in direct and constant communication with said spill passage, an outlet port for said annular recess tangentially disposed relatively thereto for facilitating the discharge of liquid circulating in the annular recess by virtue of the motion imparted to the liquid by the helical spill passage, and means operable to effect relative rotation between the plunger and the cylinder.

5. In a liquid fuel injection pump the combination of a cylinder including a pump chamber and a plunger reciprocable within said cylinder and pump chamber, a suction port in the cylinder wall, a lateral passage in the plunger adapted to coact with said port to control the admission of liquid to the pump chamber during reciprocations of said plunger within said cylinder and pump chamber, said passage being arranged in communication with an axial bore formed in the plunger and opening into the pump chamber, a spill passage formed as a helical groove on the outer surface of the plunger and having closed upper and lower ends, a pocket in the cylinder wall provided with a control edge inclined relatively to a plane transverse to the cylinder and adapted to cooperate with the closed upper end of the spill passage during each compression stroke of the plunger to by-pass liquid from the pump chamber, said pocket being in constant communication with said pump chamber, a first annular recess in the cylinder wall around said plunger and arranged in direct and constant communication with said spill passage, an outlet port for said annular recess tangentially disposed relatively thereto for facilitating the discharge of liquid circulating in the annular recess by virtue of the motion imparted to the liquid by the helical spill passage, a second annular recess concentric with the first annular recess and arranged to receive liquid from the first annular recess through said outlet port, an outlet port for the second annular recess tangentially disposed relative thereto, and means operable to effect relative rotation between the plunger and the cylinder.

6. In a liquid fuel injection pump the combination of a cylinder including a pump chamber and a plunger reciprocable within said cylinder and pump chamber, a first annular recess disposed in the cylinder wall, a lateral passage in the plunger arranged to coact directly with said first annular recess during reciprocations of said plunger within said cylinder and pump chamber to control the admission of liquid to the pump chamber, said lateral passage being arranged in communication with an axial bore formed in the plunger and opening uninterruptedly into the cylinder space, a spill passage formed as a groove extending axially of the plunger on the outer surface thereof and closed at its upper and lower ends, a pocket in the cylinder wall in constant communication with the pump chamber and provided with a control edge inclined relatively to a plane transverse to the cylinder and arranged to cooperate with the closed upper end of the spill passage during each compression stroke of the plunger to by-pass liquid from the pump chamber, a second annular recess distinct from said first annular recess and arranged in direct and constant communication with the spill passage, said spill passage being disposed at an angle to said second annular recess so that the fuel is fed tangentially to said second recess from the said spill passage, an outlet passage for said second annular recess, and means operable to effect relative rotation between the plunger and the cylinder.

7. In a liquid fuel injection pump, the combination of a cylinder including a pump chamber and a plunger reciprocable within said cylinder and pump chamber, a first annular recess in the cylinder wall controlled by the plunger acting as a slide valve during reciprocations of the plunger within said cylinder and pump chamber, said plunger having an axial bore leading to the pump chamber and having a port adapted to be brought into communication with the first annular recess in the cylinder wall at the appropriate time in each cycle of operations, a pocket in the cylinder wall in constant communication with the pump chamber and having a control edge inclined with respect to the longitudinal axis of the plunger, a spill passage entirely separate from said axial bore and comprising a helical groove having closed upper and lower ends and so arranged in the surface of the plunger that spill fuel is caused to flow from said pump chamber, through said pocket in the cylinder wall, and along said groove helically around the plunger, a second annular recess located in the wall of the cylinder and connected with the helical groove in such a manner that the fuel is fed tangentially thereto from the said groove, an outlet passage for said second annular recess, the upper closed end of said helical groove being arranged to coact with the control edge of the pocket in the cylinder wall to by-pass liquid from the pump chamber through said pocket, through said helical groove, through said second annular recess, and through the outlet passage, and means operable to effect relative rotation between the plunger and the cylinder to vary the amount of the liquid so by-passed.

8. In a liquid fuel injection pump the combination of a cylinder including a pump chamber and a plunger reciprocable within said cylinder and pump chamber, a suction port in the cylinder wall controlled by the plunger acting as a slide valve during reciprocation of the plunger within said cylinder and pump chamber, a suction passage comprising an axial bore in the plunger leading to the pump chamber and having an opening adapted to be brought into communication with the suction port in the cylinder wall at the appropriate time in each cycle of operations, a pocket in constant communication with said pump chamber and having a helically inclined control edge, a spill passage entirely separate from said suction passage and comprising a helical groove having closed ends and of the same inclination as the helical control edge of said pocket and arranged to coact with said control edge to enable the ready spill of the liquid from the control edge to the helical groove along which groove the liquid flows helically around the axis of the cylinder, an annular recess in the wall of the cylinder and in constant communication with the said helical groove, the helical control edge of the pocket and the helical groove being located one on the plunger and the other on the cylinder and arranged mutually to cooperate during each compression stroke of the plunger to by-pass liquid from the pump chamber through the pocket, through the helical groove to the annular recess, said liquid entering said annular recess tangentially from the helical groove to enable a rapid flow to be obtained, an outlet passage for said annular recess, and means operable to effect relative rotation between the plunger and cylinder to vary the amount of liquid so by-passed.

9. In a liquid fuel injection pump the combination of a cylinder including a pump chamber and a plunger reciprocable within said cylinder and pump chamber, a suction space of annular configuration in the cylinder wall controlled by the plunger acting as a slide valve during reciprocations of the plunger within said cylinder and pump chamber, a suction passage comprising an axial bore in the plunger leading to the pump chamber and having an opening adapted to be brought into communication with the suction space in the cylinder wall at the appropriate time in each cycle of operations, a pocket in constant communication with said pump chamber and having a control edge inclined with respect to the longitudinal axis of the plunger, a spill passage entirely separate from said suction passage and comprising a helical groove in the surface of the plunger, said helical groove having closed upper and lower ends, a first discharge space of annular configuration entirely separate from said annular suction space and located in the wall of the cylinder in constant communication with the said helical groove, a second discharge space of annular configuration surrounding said first discharge space and connected with a discharge port leading to the exterior of the pump, an outlet passage connecting said discharge spaces, said passage being disposed tangentially to said first discharge space, the upper end of said helical groove adapted to coact with the control edge of said pocket to by-pass liquid from the pump chamber, through the pocket, through the helical groove and to the said first discharge space, the liquid being caused to circulate rapidly in said first discharge space by virtue of the motion imparted thereto by the said helical groove, and to discharge tangentially therefrom through said outlet passage to the said second discharge space in a freely flowing uninterrupted stream, and means operable to effect relative rotation between the plunger and the cylinder to vary the amount of liquid so by-passed.

10. In a liquid fuel injection pump of the type in which the output is varied by by-passing fuel from the pump chamber at the end of the injection stroke, the combination of a cylinder including a pump chamber, a plunger reciprocable within said cylinder and pump chamber, suction and spill passages formed distinct from one another, said suction passage being disposed interiorly of said plunger and said spill passage being disposed wholly exteriorly of said plunger, said spill passage being constituted by a groove formed in the outer surface of said plunger and having closed ends and by a pocket formed in the wall of said cylinder and in constant communication with the pump chamber, means for closing said suction passage during a portion of the stroke of said plunger, a first chamber in said cylinder wall extending substantially completely around said plunger and arranged to communicate with said groove, and a second chamber in said cylinder wall extending substantially completely around said plunger and arranged to communicate with the suction passage in the plunger, said first and second chambers being arranged one above the other so as to be entirely separate from one another, the arrangement being such that a complete uniflow action of the fluel in said pump is obtained by maintaining the suction and spill fuels entirely separate from one another in their passage respectively to and from the pump chamber.

11. In a liquid fuel injection pump of the type in which the output is varied by by-passing fuel from the pump chamber at the end of the injection stroke, the combination comprising a cylinder including a pump chamber, a plunger reciprocable within said cylinder and pump chamber, suction and spill passages formed distinct from one another, the suction passage being disposed interiorly of said plunger and communicating with the exterior of said plunger through at least one lateral suction passage therein and the spill passage being disposed wholly exteriorly of said plunger and being constituted by one part formed in the outer surface of said plunger and another part formed in the wall of said cylinder, said part formed in the wall of the cylinder being in constant communication with the pump chamber and the other of said parts of said spill passage comprising a groove having closed ends, means for closing said suction passage during a portion of the stroke of said plunger, a discharge chamber for the spill fuel in said cylinder wall extending substantially completely around said plunger and arranged to be in constant communication with said spill groove, and an inlet chamber for the fuel supply also in said cylinder wall and extending substantially completely around said plunger and communicating to supply fuel to said suction passage formed interiorly of said plunger through said lateral suction passage therein, said discharge chamber for the spill fuel and said inlet chamber for the fuel supply being arranged one above the other in said cylinder wall so as to be entirely separate from one another, the arrangement being such that a complete uniflow action of the fuel in said pump is obtained by maintaining the suction and spill fuels entirely separate from one another in their passage respectively to and from the pump chamber.

RUDOLF L'ORANGE.